(12) United States Patent
Ferrucci

(10) Patent No.: US 8,015,531 B1
(45) Date of Patent: Sep. 6, 2011

(54) DEFERRED PARAMETERIZATION

(75) Inventor: Aaron Ferrucci, Santa Cruz, CA (US)

(73) Assignee: Altera Corporation, San Jose, CA (US)

( * ) Notice: Subject to any disclaimer, the term of this patent is extended or adjusted under 35 U.S.C. 154(b) by 498 days.

(21) Appl. No.: 12/121,549

(22) Filed: May 15, 2008

(51) Int. Cl.
*G06F 17/50* (2006.01)

(52) U.S. Cl. .......................... 716/117; 716/116

(58) Field of Classification Search ............ 716/5, 16, 716/17, 18, 116, 117
See application file for complete search history.

(56) References Cited

U.S. PATENT DOCUMENTS

| | | | | |
|---|---|---|---|---|
| 6,120,549 A * | 9/2000 | Goslin et al. | .................... | 703/20 |
| 7,036,107 B1 * | 4/2006 | Pritchard et al. | ................ | 716/18 |
| 7,392,489 B1 * | 6/2008 | Jackson et al. | .................... | 716/1 |
| 7,493,584 B1 * | 2/2009 | Pritchard et al. | ................ | 716/18 |
| 7,613,858 B1 * | 11/2009 | Jackson et al. | ................ | 710/104 |
| 7,627,784 B1 * | 12/2009 | Allen et al. | .................... | 714/30 |

\* cited by examiner

*Primary Examiner* — Sun J Lin
(74) *Attorney, Agent, or Firm* — Weaver Austin Villeneuve & Sampson LLP

(57) ABSTRACT

Mechanisms are provided to allow programmable chip systems to support parameter ranges or a parameter space instead of fixed parameters. A system parameter such as signal width, frequency, clock rate, may be accessed and changed at runtime instead of requiring regeneration and reimplementation of the programmable chip system. Optimized parameter values can be determined and used to generate a programmable chip system having fixed parameter values.

19 Claims, 4 Drawing Sheets

DEFERRED PARAMETERIZATION

FIELD OF THE INVENTION

The present disclosure generally relates to programmable logic devices, and more particularly, to a process of designing programmable logic devices.

DESCRIPTION OF RELATED ART

Programmable logic devices (PLDs), such as FPGA (field programmable gate array) and CPLD (complex programmable logic device) allow custom logic in an integrated circuit while avoiding time-consuming and expensive engineering processes associated with designing ASICs (application specific integrated chips). To preserve this advantage, the PLD design process is constantly improved and streamlined.

One such improvement involves design tools. Traditionally, a PLD designer describes the logic and functions of a PLD using a hardware description language such as Verilog, VHDL and Abel. Increasingly, the hardware description language files are generated by design tools based on inputs from the PLD designer/user. These design tools utilize libraries of IP (intellectual property) cores to build the HDL while still allowing the user to customize the PLD logic. These design tools reduce errors and the amount of time needed to generate an HDL file.

In addition to generating a valid design, a system designer may have certain benchmark requirements to meet and performance metrics to optimize. Benchmark requirements are certain minimum performance requirements. For example, a benchmark requirement is that the design must be able to operate at a frequency higher than a minimum frequency. Another benchmark requirement may be that the design must fit on a particular PLD. Performance metrics are often associated with characteristics having to do with cost and desirability. For example, these characteristics may be associated with using less power, allowing faster timing, providing higher throughput, etc. Example performance metrics are software benchmark values, total throughput to a specific connection point, average and peak latency, and system clock frequency. Certain optimizable metrics may be more important than others for certain system designs. For example, power usage is very important in a portable system application. Throughput may be more important in other applications, e.g., telecommunications. A designer "tunes" the design based on these requirements and metrics to arrive at an optimized product. It is desirable to provide improved methods and apparatus for optimizing programmable chips.

SUMMARY OF THE INVENTION

Mechanisms are provided to allow programmable chip systems to support parameter ranges or a parameter space instead of fixed parameters. A system parameter such as signal width, frequency, clock rate, may be accessed and changed at run-time instead of requiring regeneration and reimplementation of the programmable chip system. Optimized parameter values can be determined and used to generate a programmable chip system having fixed parameter values.

In certain embodiments, a technique for designing a device is provided. The technique may include computer-executable instructions embodied in a computer-readable medium. A first design parameter space, e.g., an array of possible parameter values, is received for a first component of a PLD. One or several design parameter spaces may be associated with each component, e.g., a processor, a hardware accelerator, an interconnect fabric, a buffer, or a UART. A PLD includes several components, at least one of which can be defined by a design parameter space. A hardware description is generated to describe a deferred parameterization (DP) design including the design parameter space received. At run-time, a parameter value is received for each design parameter space, and the device operates according to the parameter value. The device performance is measured according to one or more benchmarks and one or more metrics, e.g., throughput, latency, a software benchmark value, or a system clock frequency. The measured benchmarks and metrics are compared with desirable and historic values. If the benchmarks are not met, then one or more parameter values are changed until the benchmarks are satisfied. For optimizing metrics, several measurements are taken while varying one or more parameter values to determine the trend or effect of parameter values on the metric. The process of varying parameter values and measuring benchmarks and metrics continues until the benchmarks are met and the metrics are optimized.

The technique may further include intermediate operations. One set of intermediate operations may be to compile the design, generate a device configuration file, and configure the device with the device configuration file. Another intermediate operation may be to simulate the design. The technique is not limited to one design parameter space for one component—several design parameter spaces for one component or several design parameter spaces for several components can be used. The design parameter space may include a range or an array of values and optionally a default value.

In certain embodiments, after the optimized set of parameter values is found, the optimized design parameter values corresponding to optimized metrics is received and an optimized hardware description is generated incorporating the optimized design parameters. The optimized design is compiled, and an optimized device configuration file is generated. A device is configured with the optimized device configuration file. In some embodiments, the optimized device performance is verified by measuring the device performance according to the one or more benchmarks and the one or more metrics. The optimized hardware description may describe an optimized design including one or more design parameter spaces. At run-time, when a specified condition occurs, the device changes a parameter value within the one or more design parameter space.

In one aspect, another technique of designing a PLD is provided. The technique includes specifying a design, selecting and specifying a first design parameter space for a first component, and generating a hardware description using a design tool. The hardware description describes a DP design that includes the design parameter space. The technique also includes selecting a parameter value within each design parameter space. A device performance according to one or more benchmarks and one or more metrics is determined. The operations of selecting a parameter value and determining a device performance may be repeated until satisfactory device performance is obtained. The set of optimized parameter values corresponding to a satisfactory device performance may be specified in an optimized hardware description language file that is used to configure an optimized device. Optionally, the optimized device may be finally tested to verify that the benchmarks and metrics are still met. In some embodiments, a device is configured for performance testing. In other embodiments, a simulation is used for performance testing.

In yet another aspect, a dynamically tune-able PLD is provided. The PLD includes at least one variable system parameter that is accessible at system run-time. The variable system parameter is defined by a design parameter space. The system logic is capable of supporting all parameters in the space, under control of an accessible, or an externally settable register. The access to the register may be via a Virtual JTAG instance embedded in the logic or a shadow bus. Access to the register may be via a command line script, a graphic user interface (GUI) or other specialized software or hardware application.

In certain embodiments, the dynamically tune-able PLD includes at least one variable system parameter that can be changed at system run-time by the system logic. The system logic is capable of supporting all parameters in the space, under control of a CPU or a smart controller. When a specified condition occurs, the system logic changes the parameter value to operation more optimally.

These and other features and advantages of the present invention will be presented in more detail in the following specification of the invention and the accompanying figures, which illustrate by way of example the principles of the invention.

BRIEF DESCRIPTION OF THE DRAWINGS

The disclosure may best be understood by reference to the following description taken in conjunction with the accompanying drawings, which illustrate particular embodiments.

DESCRIPTION OF PARTICULAR
EMBODIMENTS

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of PLD design, specifically FPGA design using SOPC Builder (System-on-a-Programmable-Chip) and Quartus II™ from Altera Corporation of San Jose, Calif. However, it should be noted that the techniques of the present invention could be practiced with a variety of tools. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, an operation of selecting or receiving a parameter value is used in a variety of contexts. However, it will be appreciated that multiple parameter values can be changed at the same time while remaining within the scope of the present invention unless otherwise noted. Furthermore, the techniques and mechanisms of the present invention will sometimes describe two entities as being connected. It should be noted that a connection between two entities does not necessarily mean a direct, unimpeded connection, as a variety of other entities may reside between the two entities.

Figure 1:
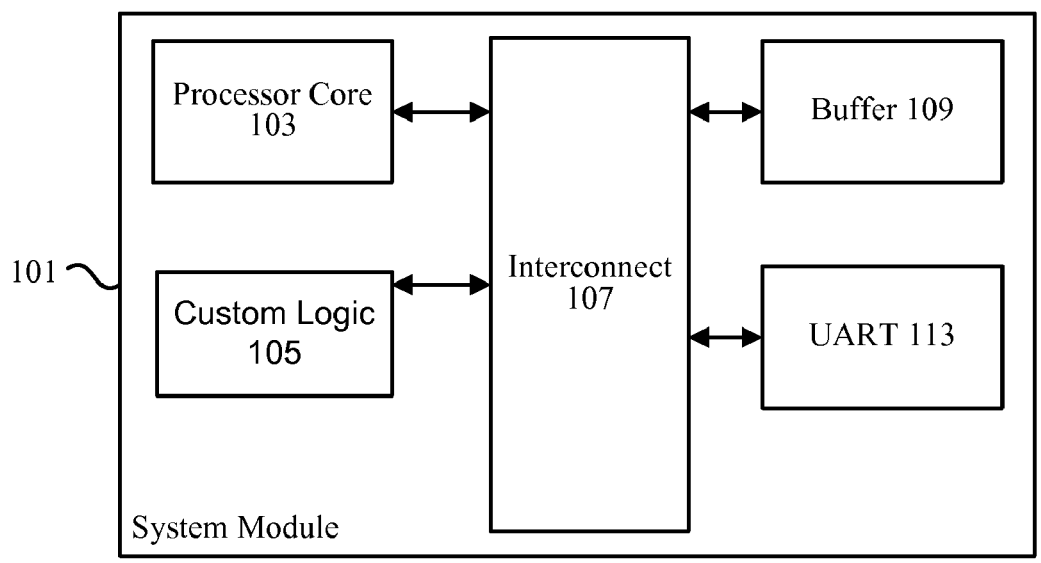
FIG. 1 is a schematic of certain design components and their relationships within a programmable logic device.

The PLD has components including logic elements such as look-up tables (LUT) or adaptive logic modules (ALM), phase locked loops (PLL), distributed memories and large memory blocks, microprocessor cores and other hard IP blocks, digital signal processing (DSP) blocks, and input/output cells including high speed serializer/deserializer (SerDes), switches, and routing interconnects. These components communicate with each other sending signals through programmable switches and routing interconnects. FIG. 1 is a schematic of certain components within an example PLD 101. In PLD 101, processor core 103 is connected to an interconnect or switch fabric 107. The interconnect 107 manages and conducts communication between all the components in the PLD 101. Custom logic 105 may be any logic component that executes user-defined logic such as a hardware accelerator. The interconnect 107 is shown also connected to buffer memory 109 and UART (universal asynchronous receiver/transmitter) 113. As depicted, UART 103 communicates with processor 103 through interconnect 107. A typical PLD includes many more components than that of FIG. 1.

A PLD design specifies the components and design parameters associated with the component. Some components are fairly complex and require many design parameters to describe while others are simpler. As an example, a UART translates data between parallel and serial forms and is a component in many PLD designs. Design parameters associated with a UART may include a baud rate, a baud divisor, the number of data bits, the number of stop bits, parity, and logic parameters as to whether the baud divisor is fixed, whether certain status pins are implemented, and whether a special termination signal can be used. As another example, a DMA (direct memory access) transfers data between a peripheral and memory without the CPU. Design parameters associated with a DMA may include a minimum width of a register, a minimum value for a number of locations in the internal memory, and whether the memory is built out of logic elements or embedded system blocks. The number of parameters required increases with complexity of the component, e.g., more parameters for a processor than a DMA engine.

Figure 2:
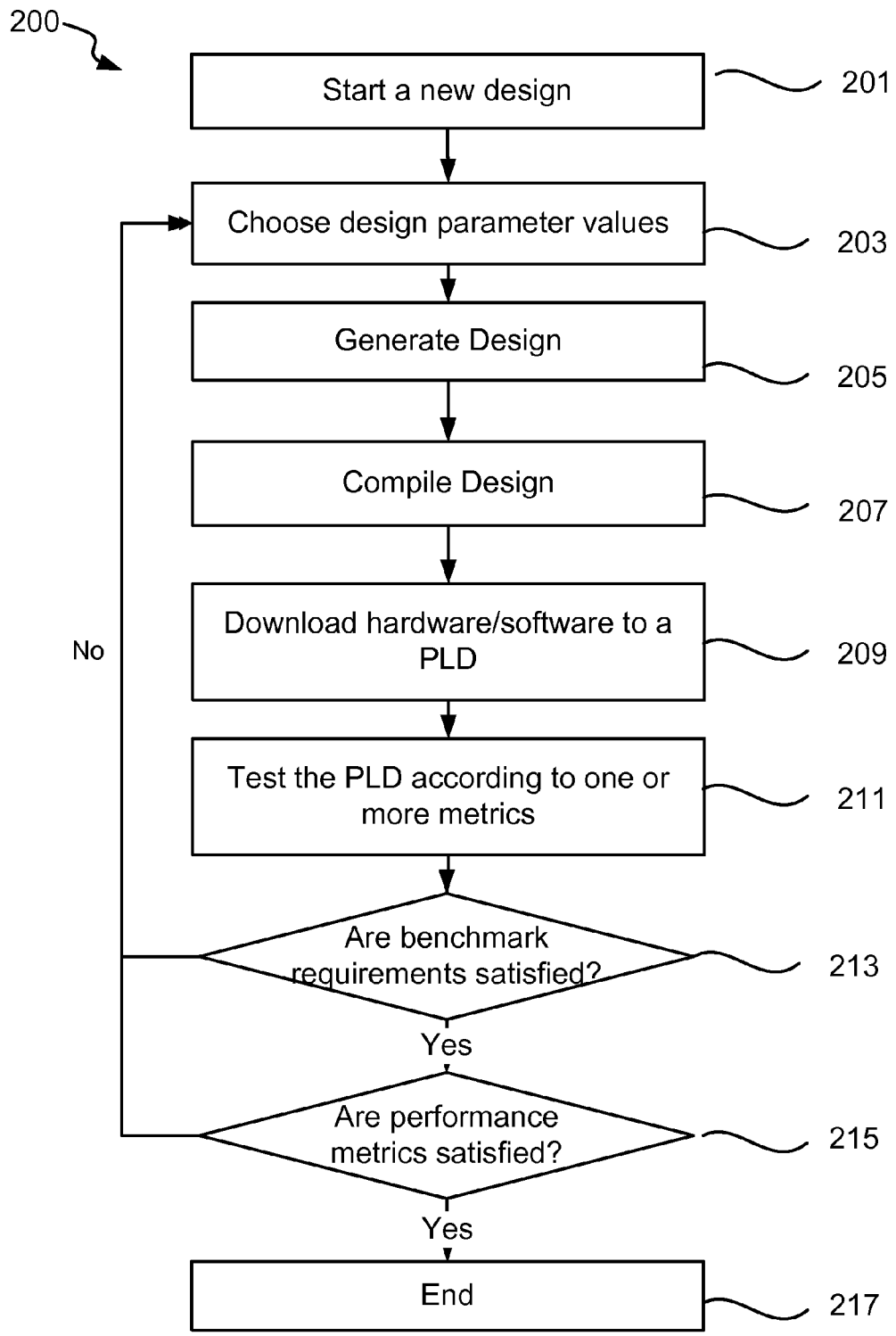
FIG. 2 is a process flow diagram depicting a PLD design process.

FIG. 2 is a diagrammatic representation showing a FPGA design implementation and optimization according to various embodiments. A design is started or initiated at operation 201. The designer specifies the components in the design and logic of component operations. The design parameter values are chosen in operation 203 for each component. In many cases, the design parameter values chosen for a component do not vary much from design to design. In other cases, the parameter values are design specific based on optimization goals and other design criteria. Selection information for logic such as a processor core as well as other components such as a streaming output to be implemented on an electronic device is entered by a designer and received by a design tool.

The selection and parameterization of components may also include configuration of variable or fixed latency support. In some examples, components selected and parameterized include intellectual property functions, megafunctions, and intellectual property cores. The designer may use a graphical user interface (GUI) with wizards for allowing efficient or convenient entry of information. The designer may alternatively write a high-level language program. A text interface or a program reading a data file such as a spreadsheet, database table, or schematic to acquire selection information may also be used. An output containing information about the various components selected is produced.

A generator program generates a logic description at operation 205. The generator program typically receives the output containing component information and generates a logic description for implementing the various modules. The generator program can be a Perl script creating HDL files such as Verilog, Abel, VHDL, and AHDL files from the component information entered by a user. A generator program also interconnects hookups between various components selected by a user. One tool with generator program capabilities is System-on-a-Programmable-Chip (SOPC) Builder available from Altera Corporation of San Jose, Calif.

After a hardware description language file is generated, the design may be compiled in operation 207. Compilation is a process where the input is synthesized and physically designed in one operation. Traditionally performed separately or even sometimes partially manually, compilation with advanced design tools automates synthesizing and physical design. However, compilation is a very computer resource intensive activity. For medium to complex designs, the compilation process can take many hours, even days, on powerful computers. A design compilation outputs a device configuration file. This file is typically a bit stream or binary file used to configure a PLD. For a FPGA, the device configuration file, e.g., a SOF file, is downloaded into the device each time the device is powered up.

Synthesis and physical design may be performed separately. A synthesis tool can take HDL files and output EDIF files or other netlist description formats such as structural VHDL or structural Verilog. Tools for synthesis allow the implementation of the logic design. Some of the available synthesis tools are Quartus Integrated Synthesis (QIS) from Altera Corporation of San Jose, Calif., Precision Synthesis, available from Mentor Graphics Corporation of Wilsonville, Oreg. and Synplify available from Synplicity Corporation of Sunnyvale, Calif.

A physical design stage typically follows the synthesis. A synthesized netlist file is provided to physical design tools including place and route and configuration tools. The place and route tool typically locates logic cells on specific logic elements of a target hardware component and connects wires between the inputs and outputs of the various elements in accordance with logic required to implement an electronic design. These various elements may be phase lock loops (PLLs), input/output (I/O) cells, controllers, digital signal processing (DSP) blocks, central processing units (CPUs), internal memory, network processors, hardware accelerators, external memory interfaces, display controllers, peripherals, and direct memory access (DMA) engines.

In certain cases, software may also be compiled. Software used by the PLD varies greatly depending on the intended use. If software is used, it is downloaded to the PLD along with the hardware configuration file in operation 209. The PLD is tested according one or more metrics in operation 211. The metrics are roughly divided into two categories: benchmark requirements and performance metrics. Benchmark requirements are must-haves for the final design. A device must, for example, perform its intended function using a specific PLD. A design would fail its benchmark requirement if it is too big for the PLD or if it does not function properly. A benchmark requirement may also be performance related, e.g. a portable device is required to use less than a specified power, or a communication device is required to operate above a certain speed. The PLD test results are compared to the benchmark requirements in operation 213. If benchmark requirements are not satisfied, then the design is restarted at operation 203 by changing the design parameter values for certain components or even by selecting alternate components.

If benchmark requirements are satisfied, a designer would typically "tune" or optimize the design according to one or more performance metrics. According to various embodiments, it is desirable for a design to minimize power usage, function correctly with a low system clock frequency, increase total throughput at specific connection points, reduce latency to various connection points, and maximize performance benchmarks value. The relative importance of various performance metrics varies depending on a variety of factors, e.g., application and environment.

Some benchmark requirements and performance metrics overlap, and one for a first device may be another for second device. For example, a requirement may be to use as little power as possible below 10 watts at peak operation. Thus the benchmark requirement is less than 10 watt peak power, and the performance metric is to minimize peak power. As discussed above, depending on the actual device and environment in which it operates, different metrics are used to optimize a device.

The performance metrics are optimized by typically testing the design with various parameter values. The optimization process is depicted as operation 215. A designer may vary one parameter value at a time or multiple values at a time and compare test results. A trend is obtained from which an optimized parameter value is selected. Depending on the number of performance metrics and their relative importance, a number of tests may be conducted, each with its generation and compilation loop. When the performance metrics are optimized to the satisfaction of the designer, the design is complete (217).

Figure 3:
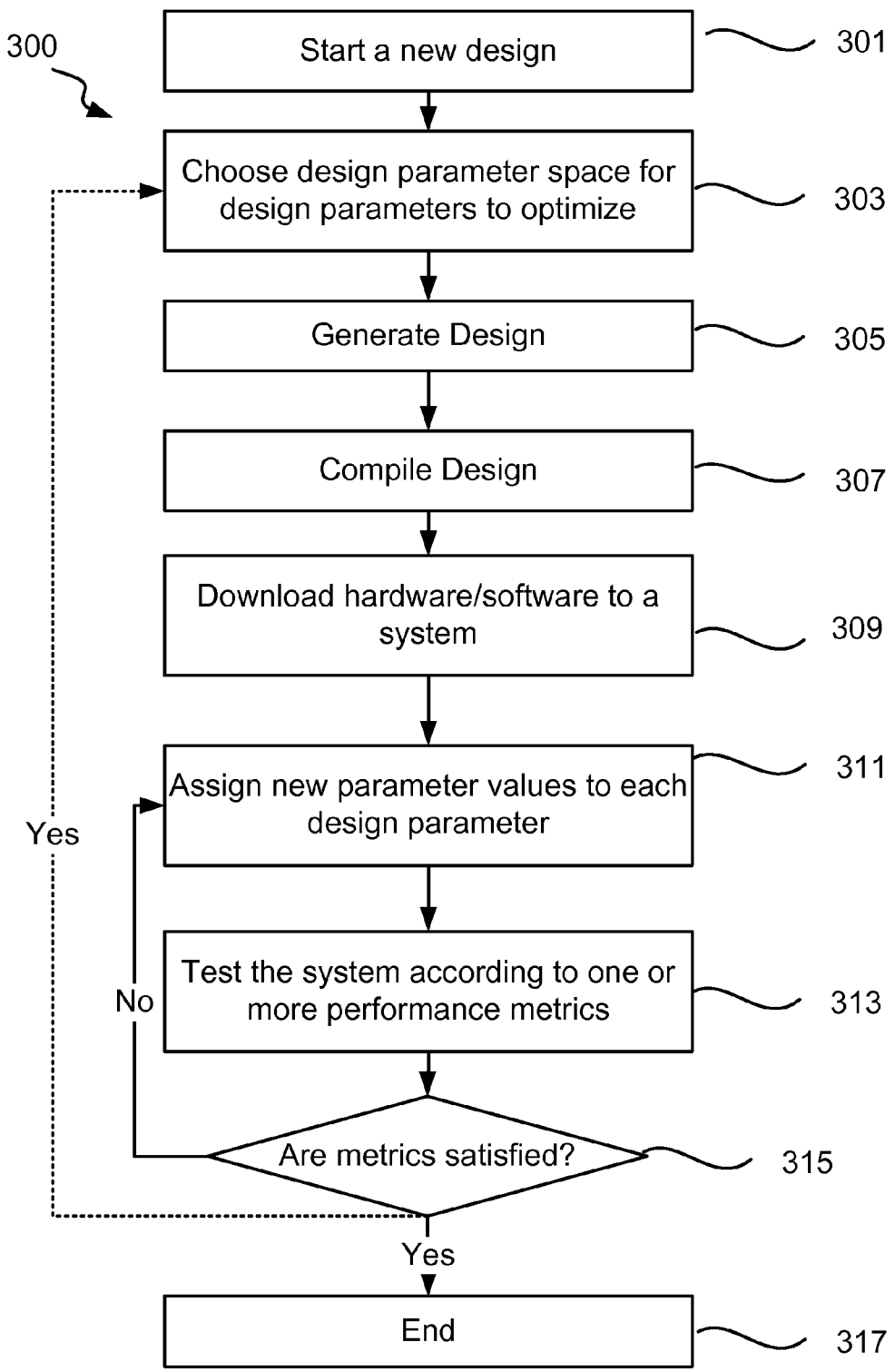
FIG. 3 is a process flow diagram depicting a PLD design process in accordance with certain embodiments of the present invention.

In accordance with various embodiments, FIG. 3 depicts a process in which the duration of each test iteration is reduced by removing the generating and compiling of design. A new design is started in operation 301. Components for the PLD are selected and added to the design. For each component, design parameters are specified. For each design parameter to be optimized, a design parameter space is chosen in operation 303 instead of a singular parameter value. A design parameter space includes the various possible parameter values for the generator program to include in the hardware description language output. A design parameter space may be a range of variables or a specific array of variables. For example, UART baud rate parameter space may be 921600, 576000, 500000, 256000, 250000, and 128000 bps. In some cases, a default value is specified, for example, 576000 bps.

When the design is generated into a hardware description language file, the different possible parameter values are incorporated into the DP design. In the UART example, various registers may be created to handle different baud rate and divisor combinations to cover the parameter space. In some cases, different components may be created to accommodate the various parameter values. For example, the 921600 bps UART may be configured as a different component from the 128000 bps UART. The component accessed during run-time depends on the actual parameter value assigned at the time.

The parameter value at run-time may be stored in one or more externally settable registers. In some cases, groups of alternate components may be created to cover the parameter space. For example, four flavors of Nios II processor cores are available, each with its subcomponents to configure. It is envisioned that a designer can set up a parameter space including two or more Nios II processors to compare them. Of course, the design including multiple alternate processors must still fit on the chip for this comparison to work.

In particular embodiments the design parameter space may be entered via a GUI, a command line, a spread sheet, menu selection, mouse click, or any input method that the generator is capable of reading. A hardware description generator, e.g., SOPC Builder of Altera Corporation, generates the DP design in operation 305. The output file may be Verilog, Abel, VHDL, AHDL, or another hardware description language that may be used as an input to a synthesizer. According to various embodiments, the design is compiled to create a bit stream file for configuring a chip in operation 307. In some cases, the design is synthesized and separately placed and routed. As discussed above, the compilation process may take many hours or even days.

Once a device configuration file is obtained, the board/chip is configured in operation 309 by downloading the hardware file and optionally compiled software. At this point, the PLD performs its intended functions and incorporates the functionality of the one or more design parameter rangers chosen in operation 303. If many alternate components are incorporated, the design may not fit on the PLD. The designer in that case may choose a reduced parameter space or use a bigger PLD.

If default values are used in specifying the design parameter space, the system, e.g., the PLD, board, and other coupled circuits, is ready for testing. New parameter values within the parameter space can be assigned to each design parameter in operation 311. The parameter values are stored in registers that may be externally accessed. In one example, the register is written via a Virtual JTAG instance embedded in the logic. JTAG is a standard test access port and boundary-scan architecture also known as IEEE 1149.1. A designer communicates with the virtual JTAG instance via the JTAG port on the PLD either directly through a system-level debugging (SLD) module of the design software, e.g., Quartus II, or through a microcontroller configured to be a JTAG port controller. In another example, the parameter registers are on a shadow bus mastered by a JTAG to Avalon Bridge. One skilled in the art can appreciate other methods and "back doors" to access these parameter registers.

In particular embodiments the designer can assign parameter values via a command line, a script, e.g., a tcl script, or through a GUI as part of a SLD module. A designer can choose to vary one parameter value at a time or several values at a time. After each parameter value change, testing is performed on the system, including the PLD, to measure performance in operation 315. The testing may be a benchmark tool, e.g., Dhrystone, EEMBC, HINT, Stream, or Bytemark. The testing results may include software results and hardware results. Some common results include the number of instructions per second, number of loops, CPU speed, interrupt latency for a specific Avalon Master, system clock frequency, power usage, and total throughput, average latency and peak latency to a specific connection point. As discussed above, the device application and operating environment typically determines the relative importance of the different metrics.

Using a tcl script, a designer can run a software benchmark tool while varying one or more design parameter values. A table can be made showing the influence of various design parameters on the benchmark rating. Thus, an optimal parameter value is determined for each design parameter space for a set of metrics. According to various embodiments, the metrics are satisfied per operation 315 when optimized parameter values are determined for the design. The parameters are varied and tests can be run until enough information is gathered to determine optimized parameter values. This process is also called parameter-space exploration.

According to various embodiments after the optimized parameters are determined, the designer can end the design in operation 317 or loop back to the parameter selection and specification stage at operation 303. Because the design generated is capable of running with a variety of parameters in a design parameter space, ending the design after testing means unused capacity remains on the PLD. Unused capacity may be ok if the design is much smaller than the chip. In some cases, a designer may deliberately choose to keep the option of further tuning the parameter values available. In these cases, using the optimized parameter values as defaults while keeping the capability of running the rest of the design parameter space may be desirable. An example scenario is in the manufacturing context where change in production line requirements may require corresponding change in installed PLD controllers.

In particular embodiments, the availability of a "back door" into the PLD to change its properties may not be desirable. A consumer product with an available back door may be susceptible to malicious attack or excessive tinkering from consumer owners. A designer may also want to remove any unused capacity in favor of increasing specification for certain components, such as memory. The optimized parameter values are entered into the design tool as fixed values at operation 303. Instead of a design parameter space having an array of parameter values and a default, the design parameter space entered would have only one value. This operation is then similar to that of operation 203 from FIG. 2. The design is generated and compiled as discussed. The design may also be downloaded and tested to verify that the metrics are still satisfied and remain at their optimal values. If the metrics have shifted, the process may be repeated by reinserting some design parameter space and re-explore the corresponding metrics with some of the parameters having fixed values.

It is envisioned that a designer may choose to finalize a design with certain parameters remaining in a design parameter space while the rest are fixed. The ability to change a parameter value at run-time can improve certain metrics under specific conditions. An example is arbitration priority. A user may find that equal priorities for read and write DMA engine master are the best most of the time. However, interrupt latency may be improved if the CPU has higher throughput during interrupt processing. A smart interrupt controller or the CPU itself may be configured to set arbitration priority in favor of the CPU when a CPU is processing an interrupt. Thus a design parameter space may be kept open without a back door being present.

Often, the PLD selected does not have much excess capacity to accommodate the larger and/or slower DP design including the design parameter space. The larger design may not meet its benchmark requirements. Because the excess components will be removed at in final design, the design parameter space exploration can still occur in some circumstances. An example is a design not meeting the maximum frequency required. The DP design can run at a lower frequency to explore a parameter set. The influence of parameter values on metrics is typically the same. Once the parameter values are chosen, the design is recompiled with the fixed parameter values that can run at the higher frequency.

Figure 4:
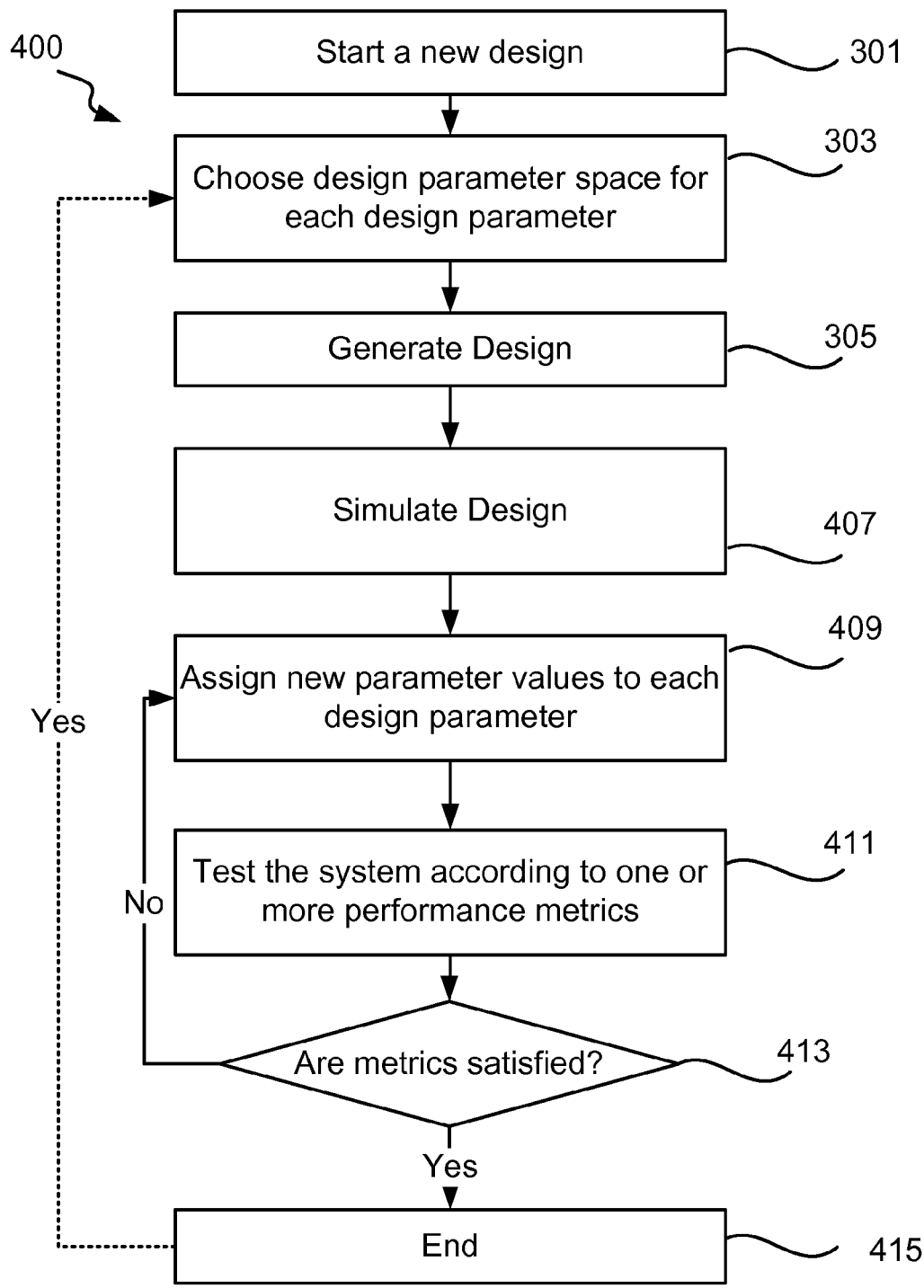
FIG. 4 is a process flow diagram depicting a PLD design process in accordance with certain embodiments of the present invention.

FIG. 4 shows an alternate embodiment of a PLD design process in accordance with various embodiments of the present invention. Instead of compiling the design and downloading the design to actual hardware, the design is simulated at operation 407. Operations 409, 411, 413, and 415 are performed in a manner similar to operations 311, 313, 315, and 317, respectively, except the operations 409, 411, 413, and 415 are performed with respect to the design simulated at operation 407. Design simulation allows the application of inputs and the observation of outputs without having to implement a physical device. Simulation tools provide designers with cost effective and efficient mechanisms for design testing and functional and timing verification. Some available simulation tools include Synopsys VCS, VSS, and Scirocco, available from Synopsys Corporation of Sunnyvale, Calif. and Cadence NC-Verilog and NC-VHDL available from Cadence Design Systems of San Jose, Calif.

According to various embodiments, the time need to tune or optimize a design is reduced. Running logic generation, synthesis, and place-and-route tools occupies a large portion of the design flow loop. By removing these operations from the tuning process, the time consumed to determine the influence of a parameter is reduced dramatically.

In particular embodiments, design parameters can be more efficiently and effectively optimized. With reduced time to determine the influence of a parameter, more parameter spaces can be explored.

Variable run-time parameters are also allowed. Having variable parameters at run-time allows creation of designs that maximize various metrics under different conditions. An example is the arbitration priority case discussed above. System performance can be dynamically tuned.

Although many of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. For example, although FPGAs are used in the various examples, the present invention is not limited to an implementation involving an FPGA as the PLD. The present invention contemplates the use of other types of programmable chip such as Complex Programmable Logic Devices (CPLD). In another example, the present invention may be practiced with a design software type not discussed above. It is therefore intended that the invention be interpreted to include all variations and equivalents that fall within the true spirit and scope of the present invention.

What is claimed is:

1. A method comprising:
receiving a plurality of parameter values for a component associated with a design;
generating a hardware description language file describing the design, wherein said generating a hardware description language file is performed based on the plurality of parameter values, wherein the plurality of parameter values are user selectable via a computer after implementation of the design on a programmable chip device, wherein said receiving a plurality of parameter values comprises receiving one of the plurality of parameter values;
measuring a device performance according to one or more benchmarks and one or more metrics; and
repeating, via a computer, the receiving one of the plurality of parameter values operation and the measuring a device performance operation until the one or more benchmarks are met and the one or more metrics are achieved.

2. The method of claim 1, wherein one of the metrics is selected from a group consisting of a throughput, a latency, a software benchmark value, a system clock frequency, and a combination of these.

3. A method comprising:
receiving a plurality of parameter values for a component associated with a design;
generating a hardware description language file describing design, wherein said generating a hardware description language file is performed based on the plurality of parameter values, wherein the plurality of parameter values are user selectable via a computer after implementation of the design on a programmable chip device;
receiving a set of design parameters corresponding to a plurality of metrics;
generating a hardware description, said hardware description describing a metric-achieving design comprising the set of design parameters;
compiling, via a computer, the metric-achieving design;
generating a metric-achieving device configuration file in response to said compiling operation; and
configuring the programmable chip device with the metric-achieving device configuration file.

4. The method of claim 3, further comprising:
measuring a device performance of the programmable chip device according to one or more benchmarks and one or more metrics; and
verifying the one or more benchmarks are still met.

5. A method comprising:
receiving a first plurality of parameter values for a first component associated with a design;
implementing the design on a programmable chip device by:
compiling, via a computer, the design;
generating a device configuration file in response to said compiling the design; and
configuring the programmable chip device with the device configuration file; and
generating a hardware description language file describing the design, wherein said generating a hardware description language file is performed based on the first plurality of parameter values, wherein the first plurality of parameter values are user selectable via a computer after the implementation of the design on the programmable chip device.

6. The method of claim 5, further comprising receiving a second plurality of parameter values for a second component.

7. The method of claim 5, wherein the first component represents a processor, a hardware accelerator, an interconnect fabric, a buffer, or a UART.

8. A method comprising:
receiving a design including a first component implemented on a programmable chip device, wherein the first component supports a first plurality of parameter values;
selecting one of the parameter values;
determining a device performance according to one or more benchmarks based on the selected one of the parameter values; and
repeating, via a computer, the selecting operation and the determining operation until the one or more benchmarks are met.

9. The method of claim 8, further comprising:
compiling the design;
generating a device configuration file in response to said compiling the design; and
configuring the programmable chip device with the device configuration file.

10. The method of claim 8, further comprising:
simulating the design.

11. The method of claim 8, further comprising selecting one of a second plurality of parameters for a second component.

12. The method of claim 8, further comprising:
determining a set of design parameters corresponding to a plurality of metrics;
generating a hardware description, said hardware description describing a metric-achieving design comprising the set of design parameters;
compiling the metric-achieving design;
generating a metric-achieving device configuration file in response to said compiling operation;
configuring the programmable chip device with the metric-achieving device configuration file;
measuring the device performance according to the metric-achieving device configuration file, one or more benchmarks, and one or more of the plurality of metrics; and
verifying the one or more benchmarks are still met.

13. The method of claim 12, wherein one of the metrics is selected from a group consisting of a throughput, a latency, a software benchmark value, a system clock frequency, and a combination of these.

14. The method of claim 8, further comprising changing the selected one of the parameter values when a specified condition occurs.

15. The method of claim 8, wherein the first component is a processor, a hardware accelerator, an interconnect fabric, a buffer, or a UART.

16. A non-transitory computer-readable medium comprising computer-executable instructions which, when executed by a computer, cause the computer to perform a method comprising:
receiving a plurality of parameter values for a component of a design;
implementing the design on a programmable chip device by:
compiling the design;
generating a device configuration file in response to said compiling the design; and
configuring the programmable chip device with the device configuration file; and
generating a hardware description language file describing the design, wherein said generating a hardware description language file is performed based on the plurality of parameter values, wherein the plurality of parameter values are user selectable after the implementation of the design on the programmable chip device.

17. A non-transitory computer-readable medium comprising computer-executable instructions which, when executed by a computer, cause the computer to perform a method comprising:
receiving a plurality of parameter values for a component of a design;
generating a hardware description language file describing the design, wherein said generating the hardware description language file is performed based on the first plurality of parameter values, wherein the first plurality of parameter values are user selectable after implementation of the design on a programmable chip device, wherein said receiving the plurality of parameter values comprises receiving one of the parameter values;
measuring a device performance according to one or more benchmarks and one or more metrics; and
repeating the receiving one of the parameter values operation and the measuring a device performance operation until the one or more benchmarks are met and the one or more metrics are achieved.

18. The non-transitory computer-readable medium of claim 17, wherein said method further comprises:
compiling the design;
generating a device configuration file in response to said compiling the design; and
configuring the programmable chip device with the device configuration file.

19. A programmable chip device comprising a component configured to support a plurality of parameter values, wherein the component is configured based on a hardware description language file describing a design representing the component, wherein the hardware description language file is generated based on the plurality of parameter values, wherein the design is compiled to generate a device configuration file, wherein the programmable chip device is configured with the device configuration file to implement the design on the programmable chip device, wherein the plurality of parameter values are user selectable via a computer after the implementation of the design on the programmable chip device.

* * * * *